United States Patent
Schwartz

(10) Patent No.: US 7,168,618 B2
(45) Date of Patent: Jan. 30, 2007

(54) RETAIL STORE METHOD AND SYSTEM

(75) Inventor: Robyn Schwartz, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/918,521

(22) Filed: Aug. 12, 2004

(65) Prior Publication Data

US 2006/0032915 A1    Feb. 16, 2006

(51) Int. Cl.
*G06K 15/00* (2006.01)

(52) U.S. Cl. .............. 235/383; 235/385; 235/454; 235/470; 705/23; 348/143; 348/150; 902/6

(58) Field of Classification Search .......... 235/383, 235/385, 462.13, 462.08, 470; 705/17, 20, 705/22, 23, 29; 348/143, 150; 902/6
See application file for complete search history.

(56) References Cited

U.S. PATENT DOCUMENTS

| | | | | |
|---|---|---|---|---|
| 4,929,819 A | * | 5/1990 | Collins, Jr. ............ | 235/383 |
| 5,231,483 A | | 7/1993 | Sieber et al. ........... | 358/125 |
| 5,729,697 A | | 3/1998 | Schkolnick et al. ..... | 395/223 |
| 6,032,127 A | | 2/2000 | Schkolnick et al. ..... | 705/23 |
| 6,507,366 B1 | | 1/2003 | Lee ....................... | 348/352 |
| 6,659,344 B2 | * | 12/2003 | Otto et al. ............. | 235/383 |
| 7,044,369 B2 | * | 5/2006 | Gantz ..................... | 235/383 |
| 7,080,778 B1 | * | 7/2006 | Kressin et al. ......... | 235/385 |
| 2002/0121547 A1 | * | 9/2002 | Wieth et al. ........... | 235/383 |
| 2002/0161651 A1 | * | 10/2002 | Godsey et al. ......... | 705/22 |
| 2004/0111454 A1 | * | 6/2004 | Sorensen ............... | 708/200 |
| 2006/0032914 A1 | * | 2/2006 | Brewster et al. ....... | 235/383 |

FOREIGN PATENT DOCUMENTS

| | | | |
|---|---|---|---|
| GB | 2 247 592 A | | 3/1992 |
| JP | 2003-263544 A | * | 9/2003 |
| JP | 2003-187335 A | * | 7/2004 |
| WO | WO 02/17235 A2 | | 2/2002 |
| WO | WO 02/017235 A3 | | 2/2002 |

* cited by examiner

*Primary Examiner*—Jared J. Fureman
(74) *Attorney, Agent, or Firm*—John R. Pivnichny

(57) ABSTRACT

Image capture devices attached to a computer processor are located in a retail store. Items of merchandise for sale are tracked from their display position to a shopping container using optical tracking software. The software is capable of identifying the items and containers optically. A list of items in each container is maintained in a database. A customer may request a listing of items in a cart at any time via a query. At checkout time, there is no need to scan the items.

20 Claims, 2 Drawing Sheets

RETAIL STORE METHOD AND SYSTEM

TECHNICAL FIELD

The invention relates to computer assisted methods of operating a retail store having merchandise on display for sale to customers and systems for performing such operations. More particularly, the invention relates to optical tracking systems for identifying items of merchandise selected by customers which is then placed in a shopping container. More particularly, the invention relates to tracking items added and removed from a shopping container using computer assisted optical methods.

BACKGROUND OF THE INVENTION

In a conventional retail store operation, customers walk about a store viewing merchandise items displayed on shelves, racks, or special display apparatus or set ups. A customer may select an item from its displayed position and place it in a shopping container such as a cart, basket or the like. Additional items may be selected and also be placed in the container by the customer. An item may also be removed from the container and placed back in its display position, or even placed in some other display position.

Eventually, the customer stops viewing merchandise and proceeds to a check out or other point-of-sale location to pay for the items selected. After payment, the customer takes the selected items outside the retail store, whether by using the same container used for merchandise selection, or by use of another type of carrying object such as a box or bag, or just by carrying the items by hand.

Various automatic methods have been devised to improve this process through application of technologies such as bar code markings and readers, or us of RFID tags. Schkolnick et al. in U.S. Pat. Nos. 6,032,127 and 5,729,697 describe an intelligent shopping cart that can automatically keep track of objects selected and placed in the cart. The objects have radio frequency tags attached. A radio frequency field from an antenna within the cart interrogates the radio frequency tags on objects with the cart. The cart has a computer to cause a periodic interrogation of all tags within the radio frequency field. A data structure within the computer's memory is then updated to include an entry for each object within the cart. The computer may also perform other useful features such as computing the total cost of all items currently in the cart and displaying this running total on a cart display. The computer may also have a credit card reader attached thereto, allowing a customer to pay the running total by swiping a credit card through the reader.

RFID tags are capable of providing considerable identification data in response to an interrogation by a tag reader, the data may be related to the object the tag is attached thereto, having been specified at the time the tag was attached. However, current RFID tag technology by itself does not provide sufficient positional accuracy to identify objects e.g. retail items by their position on a shelf in a store.

A global positioning system GPS receiver can be attached to the RFID tag to provide improved positional accuracy information. However, such GPS receivers are considerably more expensive than the attached RFID tag and although improved, still do not provide the positional accuracy needed for small retail items in a retail store.

Optical methods for tracking objects provide much higher positional accuracy. For example, Allen in UK Patent Application GB 2 247 592 A describes a rotatable reflector having a low moving mass so that a surveillance camera view can be rapidly moved in pan and tilt angles. A positional sensor on the reflector as well as relevant camera resolution provides high positional accuracy over a large range of angles.

Weinshall et al. in International Publication Number WO 02/017235 published Feb. 28, 2002, describe a rotating mirror apparatus. In this invention, the mirror may have a curved region of high magnification and additional regions of low magnification to produce an overall panoramic view.

Alternatively, two cameras of differing magnification and field of view with a flat mirror, the high magnification region may be used along with mirror angle data to produce high positional accuracy determination.

Sieber et al. in U.S. Pat. No. 5,231,483 describe an apparatus for tracking a moving object. An angular error between the camera and tracked object is processed in a digital processor to produce a video picture pleasing to human viewers.

Lee describes in U.S. Pat. No. 6,507,366 an apparatus and method for tracking an object using a camera, a zoom lens, and an automatic focus lens. The camera may be rotated about two perpendicular axes. A pan/tilt controller detects a motion vector of a tracked object and controls the camera to move in the direction of the motion vector. A zoom controller may be used to expand object search range beyond the limit of the rotational range in at least one direction.

Despite such developments, optical methods have not been widely used in retail store operations due to significant limitations such as cost, inability to track more than one object simultaneously.

OBJECTS AND SUMMARY OF THE INVENTION

It is therefore a principal object of the present invention to provide a method of operating a retail store using optical camera technologies, having enhanced capabilities.

It is another object to provide such a method wherein enhanced operational capabilities are possible.

It is yet another object to provide a system for performing such enhanced capabilities which can be economically implemented in a retail store environment.

It is a further object to provide a method for a retail store which can be operated in a facile manner.

These and other objects attained in accordance with one embodiment of the invention wherein there is provided a method of operating a retail store, comprising the steps of providing an image capture device in a retail store having items of merchandise, identifying a customer shopping container using the image capture device, using the image capture device to identify one of the items when selected by the customer, tracking the one of the items using the image capture device from the time selected until the one of the items is placed in the container or returned to a store display shelf, storing a list of all of the items in the container in a database, and displaying the listing in response to a query of the database.

In accordance with another embodiment of the invention, there is provided a system in a retail store for selling items of merchandise comprising an image capture device in the store, operatively coupled to a computer processor, a shopping container for use by a customer, the container having an optical identification capable of being identified by the image capture device, means for tracking one of the items when selected by the customer, from the time selected until the item is placed in the container, means for storing a listing of all of the items in the container in a database, and means for displaying the listing in response to a query of the database.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
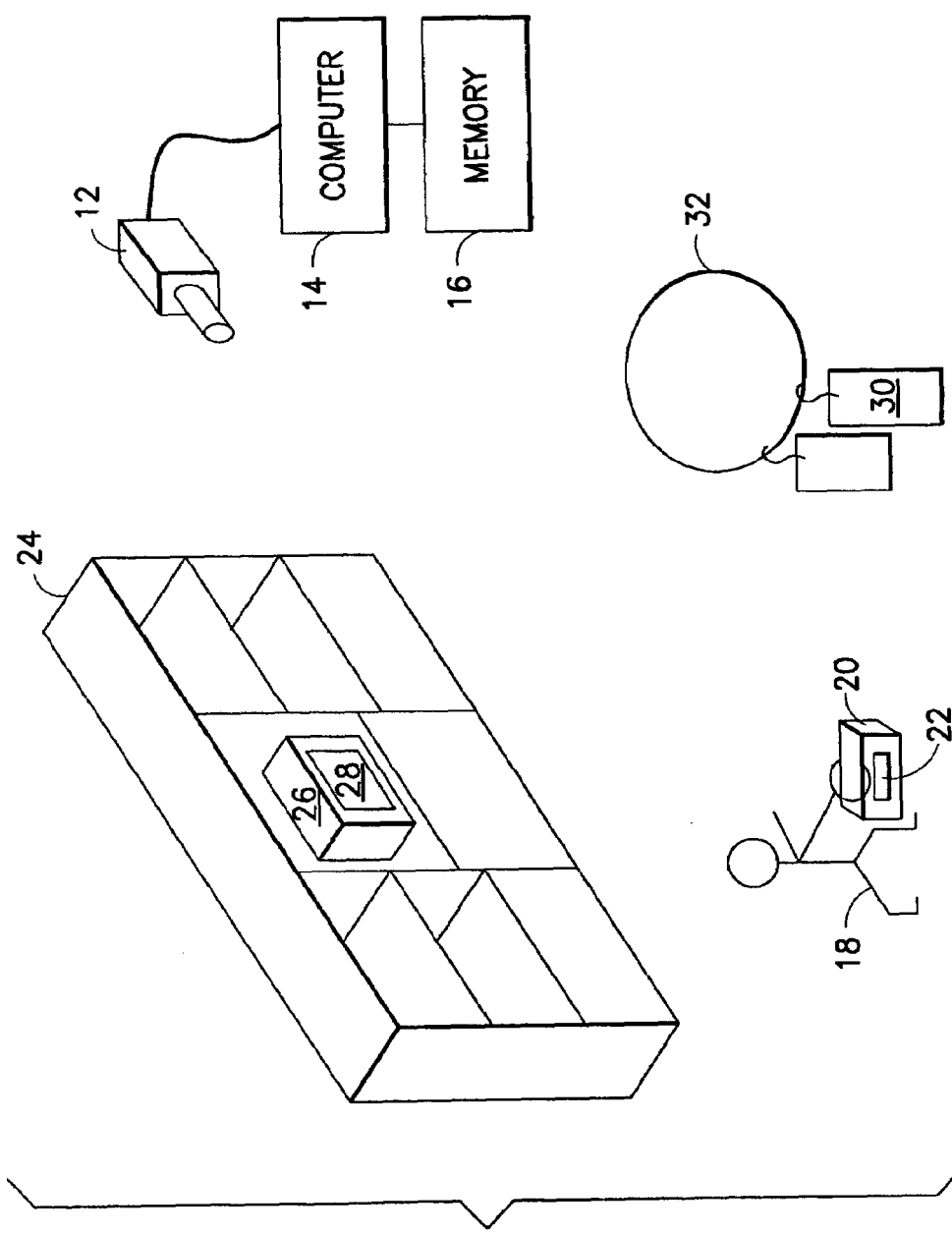
FIG. 1 illustrates an embodiment of the invention in use at a retail store.

In FIG. 1, there is shown a retail store environment capable of operating in accordance with the present invention. Image capture device 12 is in communication with computer 14. The image capture device may be a video camera such as those well known for remote monitoring, viewing, or surveillance of a distant or obscured area. Image capture device 12 may also be a digital camera capable of taking still pictures or a continuous video stream and communicating such to computer processor 14. Image capture device 12 may also be what is known in the art as a web cam or it may be any other type of imaging device capable of capturing a view of whatever appears before it. Various lenses, filters, and other optical devices such as zoom lenses, wide angle lenses, mirrors, prisms and the like may also be used with image capture device to assist in capturing the desired view. Device 12 may be fixed in a particular orientation and configuration, or it may, along with any optical devices, be programmable in orientation, light sensitivity level, focus or other parameters. Programming data would normally be provided via computer 14. To those skilled in the art, it will be obvious that more than one image capture device may be operated simultaneously without departing from the present invention. Items of merchandise 26 for sale are positioned on display shelves 24, located in a retail store (not shown). Other items of merchandise for sale 30, such as clothing, may be hung from display rack 32. Any other type of merchandise display arrangement known in the retail trade may also be used in the present invention.

For example, display shelves 24 or rack 32 may include, in addition to items for sale 26 and 30 respectively, various advertising displays, images, or postings. A multimedia display attached to computer processor 14 may also be included. The images shown on the multimedia display can be changed in real time in response to various events such as time, day of week, a particular customer approaching the shelves or rack, or items already in the customer's container.

Items for sale 26, 30 may be viewed using image capture device 12. To facilitate such viewing, an item may have attached optical identification 28. For example, identification 28 may include a bar code pattern. Other types of optical identification may be used depending on the capabilities of image capture device 12 in conjunction with computer 14, to process the information and make an identification of item 26. In some embodiments, an optical identification may be attached to more than one side of item 26.

Retail customer 18 has shopping container 20 which may be a basket, cart, or any other type of container capable of holding one or more items 26, 30. Container 20 may also have a marking 22 to facilitate identifying a particular container and/or associating container 20 with customer 18. Container 20 may also include a display device (not shown) which can present information to customer 18. The display device may be operatively connected to computer 14 via wireless, infrared, radio, or other connection technologies known in the art, for the purpose of transferring data to be displayed.

Computer 14 has associated memory 16 which may be an integral part such as the operating memory of computer 14 or externally accessible. Software for tracking objects may reside in memory 16 and run on computer processor 14. The software is capable, using one or more of image capture device 12, of tracking items 26, 30 as customer 18 removes an item from its display position and places the item into container 20. Likewise, the tracking software can track items which are being removed from container 20 and placed elsewhere in the retail store, whether placed back in their original display position or anywhere else including into another container. The tracking software can also track the position of container 20 and customer 18.

Software in computer processor 14 keeps a list of which items have been placed in each container in a database. The database may be any type of database such as a spreadsheet, relational database, hierarchical database or the like. The database may be stored in the operating memory of computer 14, or it may be stored externally, or on a recordable medium such as a hard drive, floppy drive, CD ROM, DVD device or in any other type of storage device.

The lists are updated frequently enough to maintain an accurate real time listing of the contents of each container as customers add and remove items from containers.

The listings are also made available to whatever inventory system is used in the retail store. Such listings represent an up-to-the-minute view of which items are still available for sale, for example, to on-line shopping customers. The listings may also provide a demand side trigger back to the supplier of each item.

At any time, customer 18 may request to see a listing of container contents via a query. The listing is then displayed at a location where it may be viewed by customer 18 such as on a display device attached to container 20. The list may also be displayed on some other display device located in the retail store. Customer 18 may also make such a query after leaving the retail store. For example, a query may be made using a portable device or a home computer workstation. The listing may include the quantity of each item in container 20 as well as the price for each and a total price for all items in container 20. Other data may also be displayed as part of the listing.

When customer 18 is finished shopping, she proceeds to a point-of-sale checkout station. Because the checkout station is coupled to computer 14, the items in container 20 are already known. There is no need to scan the items as is commonly done today. Customer 18 merely arranges for payment of the total, for example by use of a smart card, credit card, cash, or other payment method. In some embodiments, it may not be necessary to empty container 20 at the retail store at all, for example, if container 20 is a minimal cost item which can be kept by customer 18. In other embodiments, container 20 may belong to customer 18 who brought it to the retail store at the start of the shopping session. In other embodiments, container 20 belongs to the store and must be returned before leaving the parking lot or at some other designated time or place.

Alternatively, when customer 18 is finished shopping, she may complete checkout either in-aisle or from a final or terminal-based checkout position in the store using a transactional device which may be integral with container 20 or associated temporarily to the container, or using a consumer owned device attached to computer 14 in a temporal fashion. The customer may swipe a magstripe or use an RFID enabled payment device with the transactional device or use any biometric type of payment tender known in the art. The transactional device may also be a portable device such as a laptop computer, palm device, or any other portable device specially configured for such in-aisle checkout service, whether integral with container 20 or separately operable. The transactional device is in communication with computer 14 at the time of checkout. Checkout is performed in-aisle or at the end of the shopping trip whether from any point or from a specified point of transaction. As noted above, checkout transactional devices may be stationary shared devices or portable or mobile devices offered to the customer from the store or may be devices brought to the store by the customer, which are compatible with computer processor 14 and software residing thereon.

Figure 2:
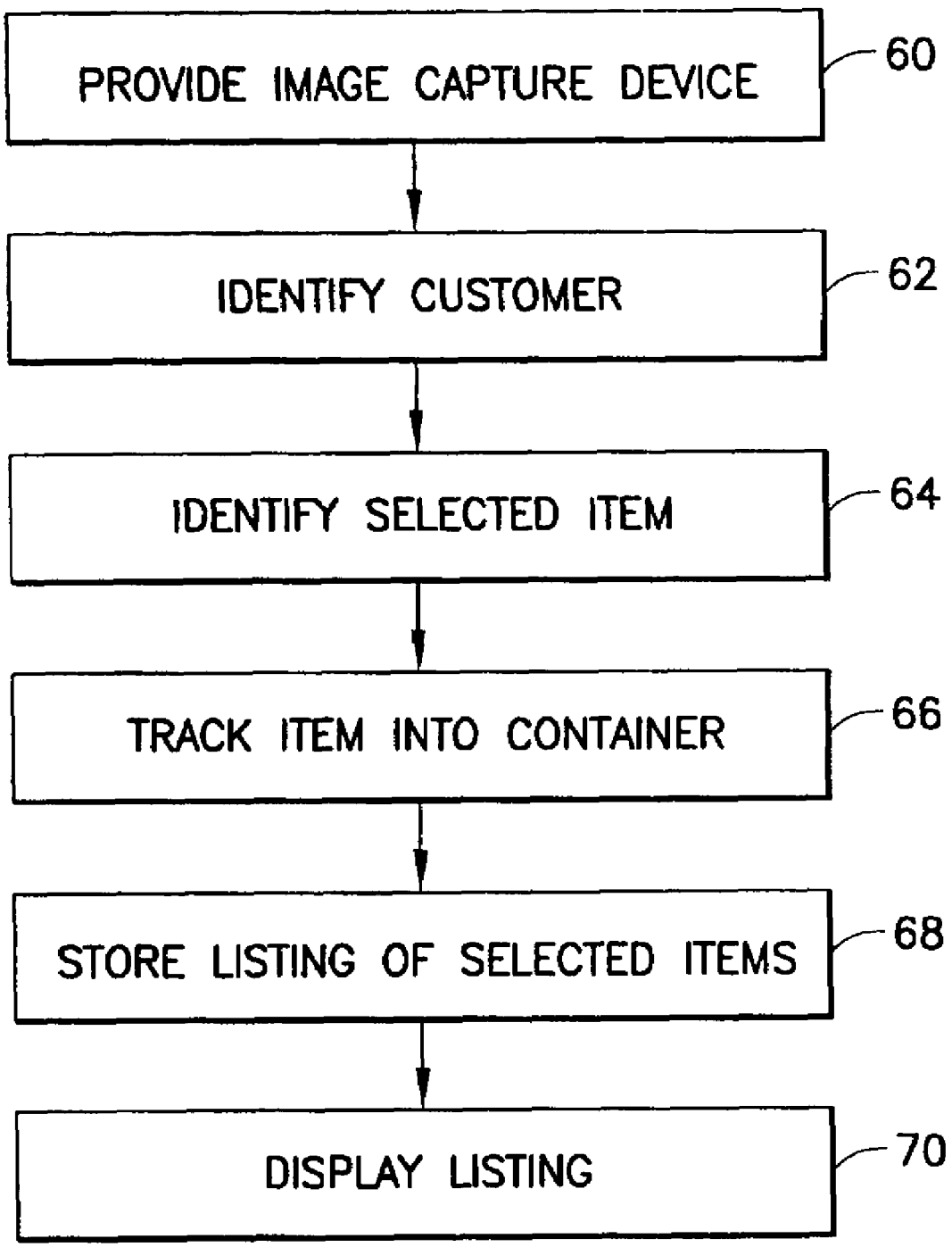
FIG. 2 is a flowchart of steps performed in operating the invention in a retail store.

In FIG. 2, there is shown a flowchart of steps performed in carrying out the present invention. In step 60, one or more image capture devices are installed in a retail store. As described above, the image capture device is attached to a computer processor running software capable of tracking objects and visually identifying items for sale, containers, and customers. Attachment of identifying marks may be part of this visual identification. Other methods of identification such as bar code, RFID, and the like may also be used without departing from but to supplement the visual techniques of the present invention.

In step 62, a customer is identified. The customer has a shopping container which is also identified. In some embodiments, the customer may be identified through identification of the container. In step 64, an item selected by the customer for example, as the customer removes the item from its stationary position on a store display, is identified.

The selected item is traced visually by the image capture device and associated software in step 66. The item is tracked until the customer places it in a shopping container.

The computer processor stores a listing of selected items placed in the shopping container, in step 68. Of course, there may be a plurality of customers simultaneously shopping. The image capture device and associated software therefore has the capability of identifying all of the shopping containers in use. Furthermore, the software is capable of tracking several items selected by various customers simultaneously. In this case, the computer processor will store a separate listing of selected items for each active customer. As noted above, the listings may be stored in a database.

In step 70, the listing is displayed in response to a query. The listing may be displayed to a customer at any time either while actively shopping or after the customer leaves the store. The listing may also be displayed to a clerk at a checkout point-of-sale terminal, to facilitate arranging payment for the selected items.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of operating a retail store, comprising the steps of:
    providing an image capture device in a retail store having items of merchandise;
    identifying a customer shopping container using said image capture device;
    using said image capture device to identify one of said items when selected by said customer;
    tracking said one of said items using said image capture device from the time selected until said one of said items is placed in said container or returned to a store display shelf;
    storing a list of all of said items in a said container in a database; and
    displaying said listing in response to a query of said database.

2. The method of claim 1, wherein said image capture device is operatively connected to a computer processor, said computer processor having access to said database.

3. The method of claim 2, wherein said image capture device further comprises a plurality of digital imaging cameras positioned about said retail store in a manner to facilitate said tracking.

4. The method of claim 1, wherein said one of said items has an optical identifier attached thereto.

5. The method of claim 1, wherein said database is stored in the operating memory of said computer processor.

6. The method of claim 1, wherein said listing is continuously updated as said shopper places additional selected items in, or removes previously selected items from said container.

7. The method of claim 1, wherein said listing is displayed on a display device attached to said container.

8. The method of claim 1, wherein said query is made by a point of sale terminal in said retail store and said listing is displayed on a display device attached to said point of sale terminal.

9. The method of claim 1, wherein said query is made by said customer while shopping in said retail store.

10. The method of claim 1, wherein said query is made by said customer after leaving said retail store.

11. The method of claim 10, wherein said query is made by said customer on a workstation located in a home of said customer.

12. A system in a retail store for selling items of merchandise, comprising:
    an image capture device in said store, operatively coupled to a computer processor;
    a shopping container for use by a customer, said container having an optical identification capable of being identified by said image capture device;
    means for tracking one of said items when selected by said customer, from the time selected until said item is placed in said container;
    means for storing a listing of all of said items in said container in a database; and
    means for displaying said listing in response to a query of said database.

13. The system of claim 12, wherein said computer processor has access to said database.

14. The system of claim 12, wherein said one of said items has an optical identification.

15. The system of claim 12, wherein said database is stored in the operating memory of said computer processor.

16. The system of claim 12, wherein said means for storing further comprises means for continuously updating said listing as said customer places additional items in or removes items from said container.

17. The system of claim 12, wherein said means for displaying further comprises a display device in communication with said computer processor and attached to said container.

18. The system of claim 1 wherein said query is a query made by said customer on a workstation located in a home of said customer.

19. A computer program product for instructing a processor to operate a retail store, said computer program product comprising:

a computer readable medium;

first program instruction means for operating an image capture device in a retail store having items of merchandise;

second program instruction means for identifying a customer shopping container using said image capture device;

third program instruction means for using said image capture device to identify one of said items when selected by said customer;

fourth program instruction means for tracking said one of said items using said image capture device from the time selected until said one of said items is placed in said container or returned to a store display shelf;

fifth program instruction means for storing a listing of all of said items in said container in a database; and sixth program instruction means for displaying said listing in response to a query of said database, and wherein all said program instructions means are recorded on said medium.

20. A computer system for selling items of merchandise in a retail store, said system comprising:

an image capture device in said store, operatively coupled to a computer processor;

means for identifying a shopping container for use by a customer, said container having an optical identification capable of being identified by said image capture device;

means for tracking one of said items when selected by said customer, from the time selected until said item is placed in said container;

means for storing a listing of all of said items in said container in a database;

means for displaying said listing in response to a query of said database; and

A multimedia display attached to said computer processor, for showing images based on said items in said container.

* * * * *